United States Patent [19]

Maurice

[11] Patent Number: 4,719,874
[45] Date of Patent: Jan. 19, 1988

[54] POULTRY BROODER

[76] Inventor: Paul E. Maurice, 14 Fontaine St., Ludlow, Mass. 01056

[21] Appl. No.: 860,529

[22] Filed: May 7, 1986

Related U.S. Application Data

[63] Continuation-in-part of Ser. No. 666,115, Oct. 29, 1984, Pat. No. 4,614,166.

[51] Int. Cl.[4] .............................................. A01K 31/20
[52] U.S. Cl. .................................... 119/32; 126/92 B; 126/39 E; 126/39 J
[58] Field of Search .............. 119/32; 126/39 E, 39 J, 126/92 R, 92 AC, 92 B

[56]  References Cited

U.S. PATENT DOCUMENTS

| | | |
|---|---|---|
| 1,929,088 | 10/1933 | Wood . |
| 2,240,571 | 5/1941 | Olson . |
| 2,361,097 | 10/1944 | Hess . |
| 2,985,137 | 5/1961 | Horne . |
| 3,027,888 | 4/1962 | DuFault . |
| 3,429,306 | 2/1969 | Thompson . |
| 3,503,379 | 3/1970 | Kuhn . |
| 3,505,976 | 4/1970 | Miller . |
| 3,926,172 | 12/1975 | Saponara ........................... 126/39 E |
| 3,976,243 | 8/1976 | Christophel . |
| 4,125,357 | 11/1978 | Kristen et al. ..................... 126/39 J |
| 4,144,832 | 3/1979 | Dahl . |
| 4,278,423 | 7/1981 | Siccardi . |
| 4,369,030 | 1/1983 | Siccardi . |
| 4,524,722 | 6/1985 | Siccardi . |
| 4,614,166 | 9/1986 | Maurice .............................. 119/32 |

OTHER PUBLICATIONS

Safe-glo Products Corp. Mark IV Brooder product brochure.

Primary Examiner—William F. Pate, III
Assistant Examiner—Richard E. Chilcot, Jr.
Attorney, Agent, or Firm—Morgan & Finnegan

[57]  ABSTRACT

A poultry brooder having a ceramic radiant element with protrusions and protrusion connectors forming spiral channels to lengthen the path of flowing gases from the closed center to the edge of the radiant and to impede the gaseous flow by turbulence. An insulator reduces undirected heat loss through the rear surface of the ceramic radiant and an electronic direct spark ignition system conserves fuel consumption and makes the brooder more reliable.

28 Claims, 9 Drawing Figures

POULTRY BROODER

RELATED APPLICATIONS

This application is a continuation-in-part of co-pending U.S. patent application Ser. No. 666,115 filed Oct. 29, 1984 now U.S. Pat. No. 4,614,166.

BACKGROUND AND OBJECTS OF THE INVENTION

1. Field of the Invention

The present invention relates to a poultry brooder and, more specifically, to a poultry brooder in which a radiant element is suspended over a heat source such as a thermostatically controlled direct spark ignition gas burner. 2. Description of the Prior Art Various attempts have heretofore been made to provide an efficient poultry brooder to be suspended in a poultry house for controlling brooding temperature. Maintaining proper brooding temperature is critical to effective poultry brooding since temperature variations cause chicks to expend energy to maintain body temperature rather than to increase body weight. Expending energy to increase body weight desirably results in larger, more saleable birds and enables chicks to resist disease. Thus, poultry house temperature variation can result in smaller, less desirable birds and can cause weaker chicks to contract diseases which, in turn, may spread to other chicks. Naturally, the poultry farmer desires to maximize productivity by producing as much meat as possible for the feed consumed. The desirable result is to keep the bird warm so that the food energy contained in the feed is used to produce weight gain rather than body heat.

A competing goal, however, is to obtain the desired warming of the chicks with minimum fuel consumption. Poultry farmers typically raise thousands of chicks using many poultry brooders. Consequently, the farmer desires the most fuel-efficient burner available to minimize energy costs.

Structures for maintaining temperature on a poultry house floor traditionally concentrate on radiating heat downward onto the chicks, either by being supported above the floor on a pedestal or suspended from the poultry house ceiling. Prior art structures have, for the most part, concentrated on distributing heat from a small heat source, typically a gas burner, over as great a floor surface area as possible.

One such structure is disclosed in U.S. Pat. No. 3,027,888 issued to Du Fault for POULTRY BROODERS. Du Fault discloses a spiral gas burner positioned within a cylindrical perforated screen beneath a flat deflecting plate. In operation, the Du Fault spiral gas burner increases the burner surface area to heat the perforated screen and flat deflecting plate, which spread heat over the poultry house floor. A similar structure is shown in U.S. Pat. No. 3,503,379 issued to Kuhn for RADIANT HEATING DEVICE, which discloses a ring-shaped burner to heat vertical screens, all beneath a deflecting plate.

In U.S. Pat. No. 2,985,137 issued to Horne for a CHICKEN BROODER, a perforated screen radiant is configured in an inverted frusto-conical shape to increase the surface area of the poultry house floor heated by this radiant. As with other perforated screen radiants, heated gas must penetrate the screen in order to heat that screen and cause it to radiate. Horne discloses a gas burner positioned above the perforated screen but below a baffle to accomplish full penetration of the screen by the hot gases. The baffle forces heated gases from the burner outward through the screen. Horne also discloses insulating the rear surface of the baffle to prevent heat from dissipating rather than being forced through the screen.

No prior art structures involving perforated screen radiants disclose any method for evenly controlling the heating of the radiant. Rather, in these structures the heated gas randomly passes or is forced through the perforated screen.

Structures which obtain more even heating of the radiant element involve inverted frusto-conical ceramic elements suspended above a gas burner which contact heated gases flowing outwardly across the radiant. One such structure is disclosed in U.S. Pat. No. 3,429,306 issued to Thompson for a GAS HEATING UNIT FOR BROODER. The ceramic element there disclosed is provided with projections on the lower surface thereof. In the Thompson brooder, however, the heated gas flows across the ceramic element by a direct path through the protrusions to the edge thereof.

Another brooder involving a ceramic radiant element is disclosed in U.S. Pat. No. 3,505,976 issued to Miller for a GAS FIRED CHICK BROODER DEVICE. There, a ceramic radiant element positioned above a gas burner and having randomly positioned projections on the bottom surface thereof is disclosed. The pitch of the bottom surface of the ceramic element varies from relatively steep near the center to relatively flat or even oppositely pitched at the outer edges in order to allow hot gases to travel across the ceramic element quickly at the center and more slowly at the edges thereof. However, as in the Thompson U.S. Pat. No. 3,429,306 structure, the heated gases flow to the edge of the ceramic element by a direct path between the projections. Such direct flow does not achieve even heating of the ceramic element.

None of the prior art structures which disclose a ceramic element heated by contact with hot gases to radiate energy downwardly discloses a structure which maximizes efficient heat transfer from the hot gases to the ceramic radiant element while also preventing inefficient heat loss to the surrounding environment.

All of the prior art gas fired poultry brooders include pilot burners for igniting the main gas burner. The pilot burners remain lit during all non-heating periods when the main burner is extinguished so that the main burner can be re-ignited on demand. It has been found that the fuel consumption of pilot burners alone can be considerable for poultry farmers who utilize many brooders. In addition, prior art pilot burner structures have often been found to become clogged by dust and particulate matter commonly found in poultry houses. Since the main burner cannot be ignited if the pilot burner is extinguished by clogging, the ultimate objective of heating the chicks can be defeated by pilot burner clogging. If proper safety features are not installed in the gas supply or if the safety features fail, extinguishing the pilot burner can also result in dangerous leakage of gas into the poultry house. Obviously, latent gas presents a hazard to both the farmer and the birds.

Another method of heating poultry houses is the "Whole House" method of heating. In that method, external air is heated and driven into the poultry house. Examples of the whole house method of heating poultry houses are discussed in the following U.S. patents issued to Frank J. Siccardi:

| U.S. Pat. No. | Issue Date | Title |
|---|---|---|
| 4,278,423 | July 14, 1981 | Heating and Ventilating System for Poultry Houses |
| 4,369,030 | Jan. 18, 1983 | System for Controlled Heating and Ventilating of Poultry Houses |
| 4,524,722 | June 25, 1985 | Livestock Enclosure-Environmental Control Method |

Typically, the whole house method of heating relies, at least in part, upon poultry brooders of the type to which the present invention relates. Therefore, poultry brooders compliment the whole house method and are not displaced thereby.

3. Objects of the Inventions

Accordingly, one object of the present invention is to provide a ceramic radiant element which is adapted to control the flow of hot gases thereover.

A further object of the present invention is to provide, in a ceramic radiant element adapted to control the flow of hot gases thereover, maximum energy transfer from the hot gases to the radiant element.

Yet a further object of the present invention is to minimize inefficient dissipation of energy by the radiant element to the atmosphere.

Another object of the present invention is to provide, in a thermostatically controlled poultry brooder, a safe and reliable ignition system.

A further object of the present invention is to provide a thermostatically controlled poultry brooder which does not rely upon a pilot burner ignition system to ignite the main burner during heating periods.

These and other highly desirable and unusual results are accomplished by the present invention in an economical structure which may be operated with little or no personal attention by the poultry farmer to attain remarkable fuel savings.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, steps, and improvements herein shown and described.

SUMMARY OF THE INVENTION

Briefly described, the present invention is directed to an efficient poultry brooder including a new and improved radiant element and a direct spark ignition system. The radiant element is configured to force hot gases incident at its center to traverse the radiant to its periphery by a circuitous route, thereby lengthening the time that the hot gases are in contact with the radiant element and assuring efficient heating thereof. The poultry brooder according to the present invention efficiently prevents undirected heat loss from the radiant element and remarkably permits the complete elimination of the pilot burner in gas-fired poultry brooders.

In accordance with a preferred embodiment of the present invention, the radiant element is an inverted, frusto-conical ceramic element closed at its narrow end. Ceramic radiant projections are disposed on the bottom surface of the ceramic element in a pattern of spiral rows from the closed center to the periphery of the ceramic element. Advantageously, the projections are connected by thin walls or webbing to form passageways or channels corresponding to the spiral rows and to increase the radiant surface area of the ceramic element. The thickness of the channel walls formed by the projections and projection connectors is irregular since the diameter of the projections is larger than the thickness of the connecting wall sections. This irregularity creates turbulence in gases flowing through the channels, inhibiting the flow of the hot gases to further increase the time that the hot gases remain in contact with the ceramic element.

An insulator is provided which rests on the upper rim of the ceramic element and is thereby suspended behind the rear surface of the ceramic element. The insulator is preferably shaped to conform closely to the rear surface of the ceramic element without directly touching that surface. The preferred insulator is an alumina-silica compound which is relatively inexpensive and can withstand the high operating temperatures of the poultry brooder. Thus, according to the present invention a one-half inch thick alumina-silica insulator exposed to a hot surface at 1,000° F., i.e., the approximate temperature of the rear surface of the ceramic element, yields a cold surface at approximately 325° F. This lightweight insulation remarkably maximizes the amount of heat and radiant energy that is retained by the ceramic element and, consequently, directed from the ceramic element toward the poultry house floor.

In the preferred embodiment of the invention an electronic direct spark ignition system is provided which remarkably permits the complete elimination of any gas pilot burner. The Honeywell electronic spark system is advantageously and surprisingly provided directly beneath the center of the ceramic element. The direct spark ignition system has been shown to achieve outstanding fuel savings which more than offset the minor consumption and cost of electricity incurred using the spark system.

In a poultry brooder constructed in accordance with the present invention, hot combustion products from a gas burner rise to and impinge upon the ceramic radiant element at the closed center thereof. The hot gases flow outwardly from the center of the ceramic element, traveling through the spiral channels, to the periphery of the radiant element. Substantially all of the hot combustion products flow through the spiral channels and, when the ceramic element is level, are evenly distributed among the channels. The variations in the width of the channels created by the different thicknesses of the projections and thin connector walls or webs, respectively, create turbulence which impedes the flow of the hot gases. The spiral channels increase the linear distance traveled by the hot gases to reach the edge of the ceramic element and the turbulence created by the varied positions of the projections and connectors decreases the flow of the hot gases. Together, these effects maximize the surface area and length of time that the hot gases contact the ceramic element and, hence, increase the transfer of energy from the hot gases to the ceramic element.

In addition, the insulator element minimizes undirected dissipation of the energy transferred to the ceramic element so that maximum radiant energy and heat can be directed to the poultry house floor. Prior art poultry brooders have substantially ignored heat loss through the non-directed surfaces of the radiant element, i.e., through the back surface thereof, but since temperatures of 1,000° F. are commonly reached at such surfaces it has been found that considerable undirected energy dissipates therefrom and is wasted. The insulator element of the poultry brooder according to the present invention reduces undirected heat loss through the top or rear surface of the ceramic element by effectively reducing the temperature above and behind the radiant from about 1,000° F. to about 325° F. under normal operating conditions. Thus, considerable energy savings can be accomplished by practicing this aspect of the present invention.

Finally, the direct spark ignition system economically eliminates any need for fuel consumption, as by a pilot burner, when the main burner is not in use. The direct spark ignition system is activated only when the main burner is being lit and remains activated only until the main burner is ignited. Since the pilot burner is eliminated there is also no likelihood that a pilot burner will become clogged and fail to operate. More importantly, the poultry farmer need not watch the pilot burners closely and spend time clearing and relighting clogged pilot burners. The savings alone in terms of human labor formerly spent checking, clearing and relighting extinguished pilot burners are outstanding.

It will be apparent from the foregoing general description that the objects of the invention specifically enumerated herein are accomplished by the invention as here embodied.

Thus, as one advantage of the present invention, hot gas combustion products are evenly distributed among the spiral channels to achieve uniform heat transfer to the ceramic element.

As a further advantage of the present invention, the spiral passages surprisingly confine the flow of the hot gases to a path having a linear distance which is considerably longer than the direct path from the center to the peripheral edge of the ceramic radiant element, thereby increasing the time that the hot gases remain in contact with the ceramic element to thereby maximize energy transfer thereto.

As yet a further advantage of the present invention, the flow of hot gases through the spiral channels is impeded by turbulence resulting from the irregular width of the spiral channels. The varied thicknesses of the projections and the connectors therebetween create this irregular channel width and, hence, turbulence to effectively hinder the progress of the flowing gases, thereby increasing the time that the hot gases remain in contact with the ceramic element to transfer energy thereto.

As yet a further advantage of the present invention, inefficient dissipation of heat loss through the back of the ceramic element is minimized by the insulator element.

Another advantage of the present invention is that the direct spark ignition system remarkably allows the brooder to be operated so that fuel is consumed only when the brooder is in operation. The direct spark ignition system also eliminates any likelihood that a pilot burner will undesirably become clogged and fail to operate.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate preferred embodiments of the product of the present invention, and together with the description serve to explain the principles of the invention.

DESCRIPTION OF THE PREFERRED EMBODIMENTS

Figure 1:
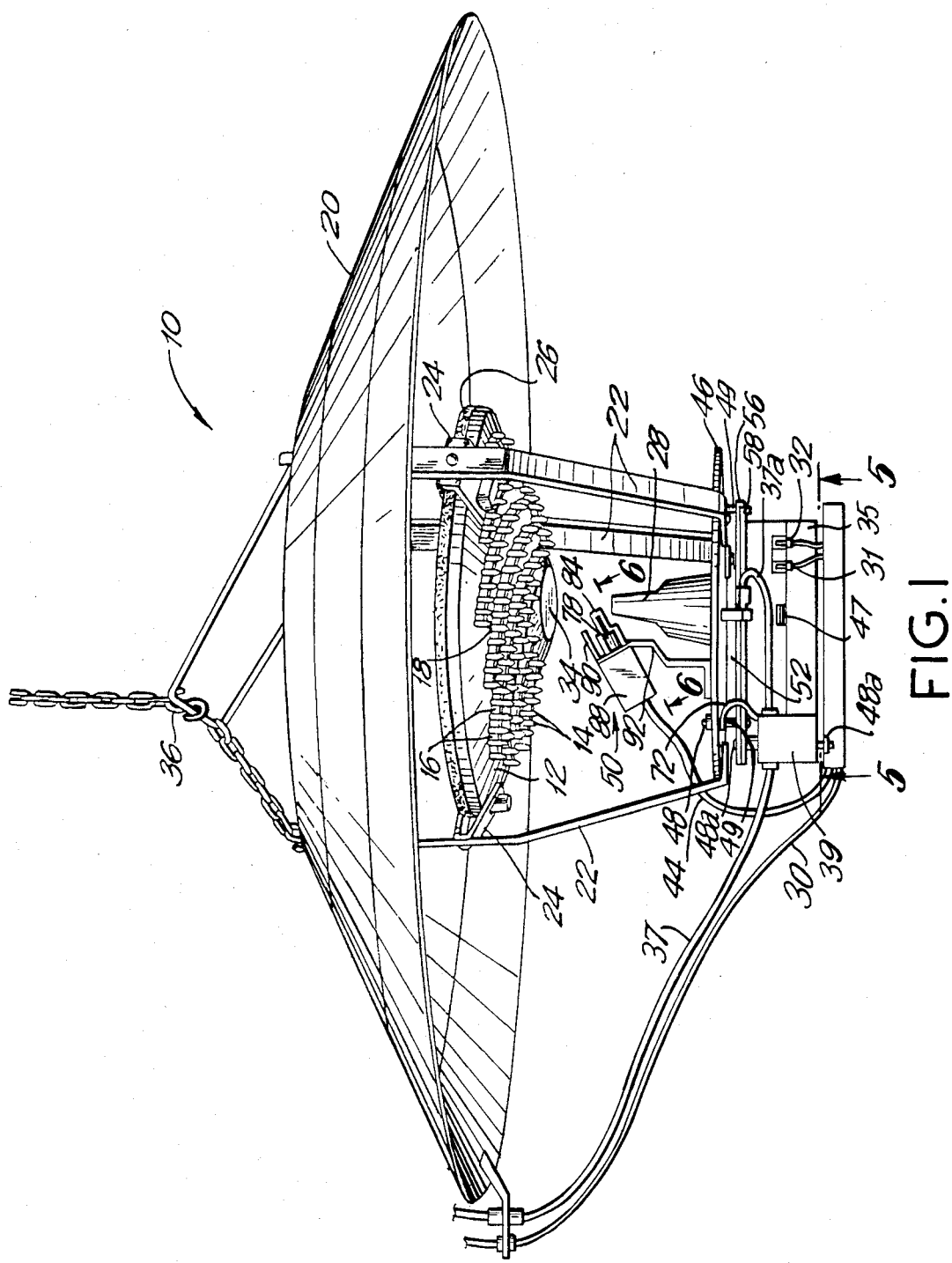
FIG. 1 is a perspective view of a poultry brooder constructed in accordance with the preferred embodiment of the present invention.

Referring now more particularly to FIG. 1, there is illustrated a preferred embodiment of the poultry brooder in accordance with the present invention, indicated generally by reference numeral 10. As here embodied, poultry brooder 10 includes an inverted frustoconical ceramic radiant element 12 having a closed flat center 34 and radiant projections 14 protruding from the bottom surface connected by thin connecting walls 16 to form spiral passageways, aisles or channels 18. The ceramic radiant 12 preferably is suspended from canopy roof 20 via suspension arms 22 and clamps 24. Clamps 24 also secure insulator element 26 in position behind ceramic radiant 12. Suspension arms 22 also support a gas burner 28 directly beneath ceramic element 12. Gas burner 28 is actuated and controlled by an electronically controlled thermostat (not shown) via wire 30 connected to terminals 31 and 32 of electronic control 35. Liquid propane or natural gas feed line 37 is connected to gas solenoid valve 39 which is controlled by electronic control unit 35. Also connected to solenoid valve 39 is the gas burner feed line 37a, which provides fuel to gas burner 28 when solenoid valve 39 is in the open position. Gas burner 28 is ignited by the electronic spark unit 50. As will be discussed in more detail below, both the solenoid valve 39 and the electronic spark unit 50 are controlled by electronic control unit 35. A leveling hangar 36 is provided for suspending poultry brooder 10 from the poultry house ceiling. An appropriate leveling hangar is currently available on poultry brooders marketed by Safe-glo Products of Springfield, Mass.

Figure 2:
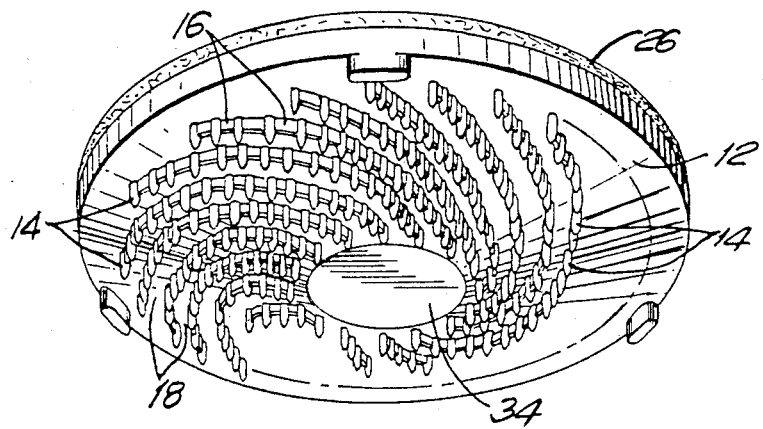
FIG. 2 is a perspective view of the radiant element shown in FIG. 1 as part of the poultry brooder according to the present invention.

As shown more particularly in FIG. 2, a perspective view of the radiant element and insulator according to the invention with reference numerals corresponding to FIG. 1, the center of the inverted frusto-conical ceramic radiant element is closed by flat center 34, which in practice is leveled by the leveling hanger 36 shown in FIG. 1. Radiant projections 14 and projection connectors 16 preferably are disposed on the bottom surface of ceramic radiant 12 in a spiral arrangement to form spiral channels 18. Connectors 16 effectively prevent gases from flowing between projections 14 other than through spiral channels 18, so gas flowing from flat center 34 to the edge of ceramic element 12 must follow channels 18. Connectors 16 also increase the radiant surface area of ceramic element to maximize the emission of radiant energy therefrom. Insulator 26 is shown in contact with the rim of the ceramic radiant element.

Figure 3:
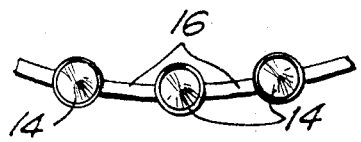
FIG. 3 is an enlarged, partial plan view of the radiant element projections and projection connectors shown in FIGS. 1 and 2.
Figure 3A:
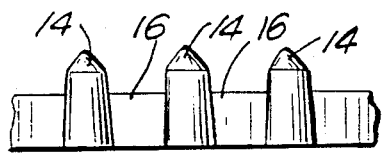
FIG. 3A is an enlarged, partial elevation view of the radiant element projections shown in FIGS. 1 and 2, wherein the projections are connected by a thin wall.
Figure 3B:
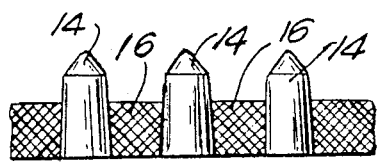
FIG. 3B is an enlarged, partial elevation view of an alternative embodiment of the invention, wherein the radiant element projections shown in FIGS. 1 and 2 are connected by thin webbing.

As best seen in FIG. 3, an enlarged, partial plan view of the radiant projections 14 and projection connectors 16 with reference numerals corresponding to FIGS. 1 and 2, connectors 16 are relatively thin in comparison to radiant projections 14. Connectors 16 effectively prevent gases from leaving spiral channels 18, which would otherwise flow between projections 14 directly toward the nearest edge of the ceramic radiant element. Therefore, in the invention as here embodied, in order for gases to flow from the center of the ceramic radiant to the edges thereof the gases must flow inside the spiral channels 18, which increases the distance travelled by the gas from the center to the edge of ceramic radiant 12. In addition, the difference in the thicknesses of projections 14 and connectors 16 creates an irregular spiral channel wall across which the gases are forced to flow. The irregular spiral channel wall creates turbulence in the gas flowing though spiral channels 18, impeding its flow therethrough to increase the length of time such gases remain in contact with the ceramic radiant element. FIGS. 3A and 3B, partial elevation views of radiant projections 14 and connectors 16, illustrate connectors 16 as thin walls and closely spaced webbing, respectively. Both the thin walls and webbing construction appropriately prevent gases from flowing directly toward the edge of the ceramic radiant element and create turbulence to inhibit the flow of gases through the spiral channels.

Figure 4:
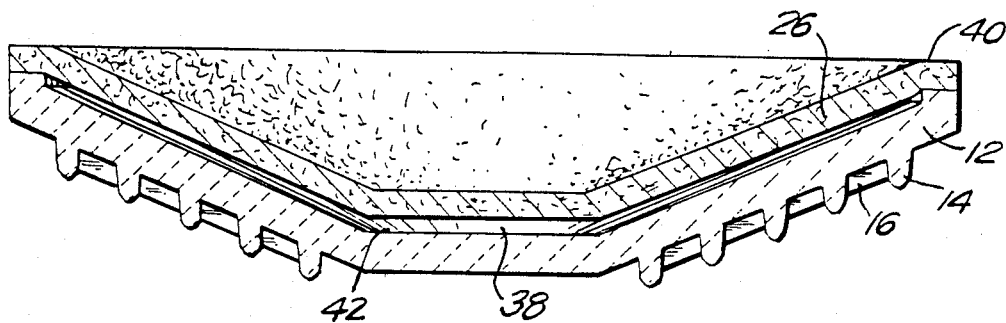
FIG. 4 is a cross-section elevation view of the radiant element and insulator shown in FIG. 1 as part of the poultry brooder according to the present invention.

FIG. 4, a cross-sectional view of ceramic radiant element 12 and insulator 26 with reference numerals corresponding to FIGS. 1-3, illustrates the preferred relationship between these elements. In the preferred embodiment of the present invention, insulator 26 is shaped similarly to ceramic radiant 12, that is, as an inverted frusto-conical section closed at its lower center end. The top of insulator 26 has an outwardly projecting lip 40 which rests on the rim of radiant 12 to support the insulator over the rear surface 42 of the ceramic radiant. Preferably, insulator 26 contacts ceramic radiant 12 only at the rim, as described above, creating an air gap 38 between rear surface 42 and insulator 26 as shown in FIG. 4. Air gap 38 provides further insulation of rear surface 42 in addition to that directly provided by insulator 26. Displacement of insulator 26 from rear surface 42 in this manner also prevents direct contact of the insulator with the highest temperatures of the ceramic element, thereby slightly reducing the maximum temperature the insulator must withstand.

The insulator itself should be lightweight and economical but must withstand the considerable temperatures attained by the ceramic radiant. An alumina-silica mixture currently available from Ferro Corporation, Newton Falls, Ohio under the name "Thermalite" has proven satisfactory and can be readily molded to the desired shape. Typically, a one half inch thick Thermalite insulator exposed to a rear surface operating temperature of approximately 1,000° F. will yield a cold face temperature of approximately 325° F. Should the rear surface reach an operating temperature approximating 1,500° F. the cold face temperature will approximate 450° F. Thus, the energy saving of the present invention attributable to the insulator alone is significant since energy previously spent to produce heat lost through rear surface 42 may now be directed toward the poultry house floor.

Figure 5:
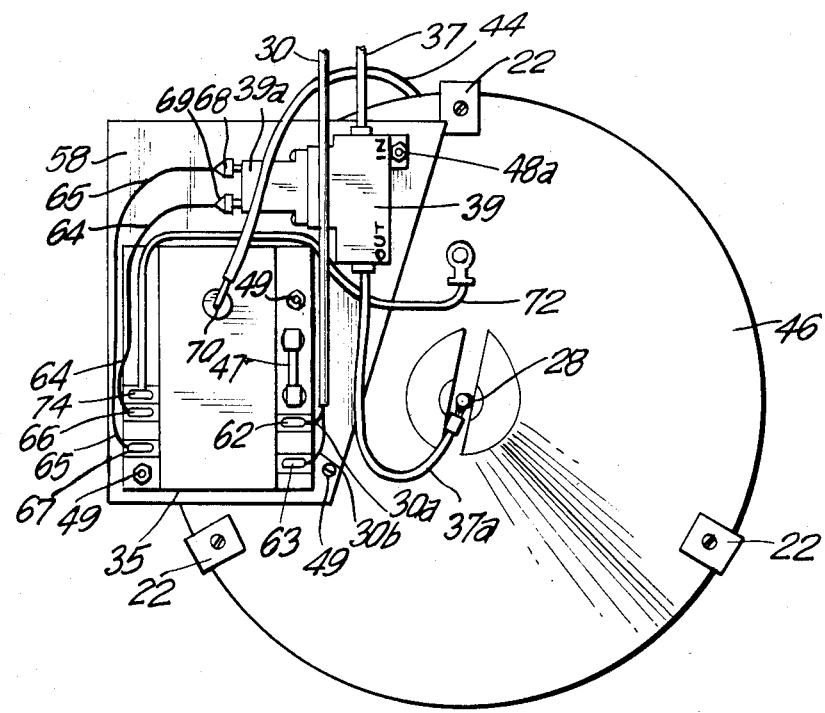
FIG. 5 is a partial bottom plan view of the preferred embodiments of the poultry brooder according to the present invention along lines 5—5 of FIG. 1, showing the direct spark ignition system.
Figure 6:
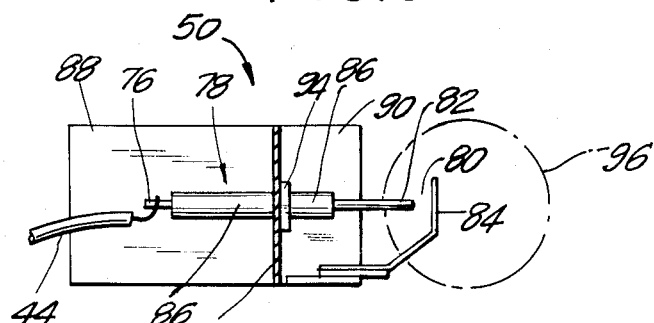
FIG. 6 is a bottom plan view of the direct spark unit along lines 6—6 of FIG. 1.
Figure 7:
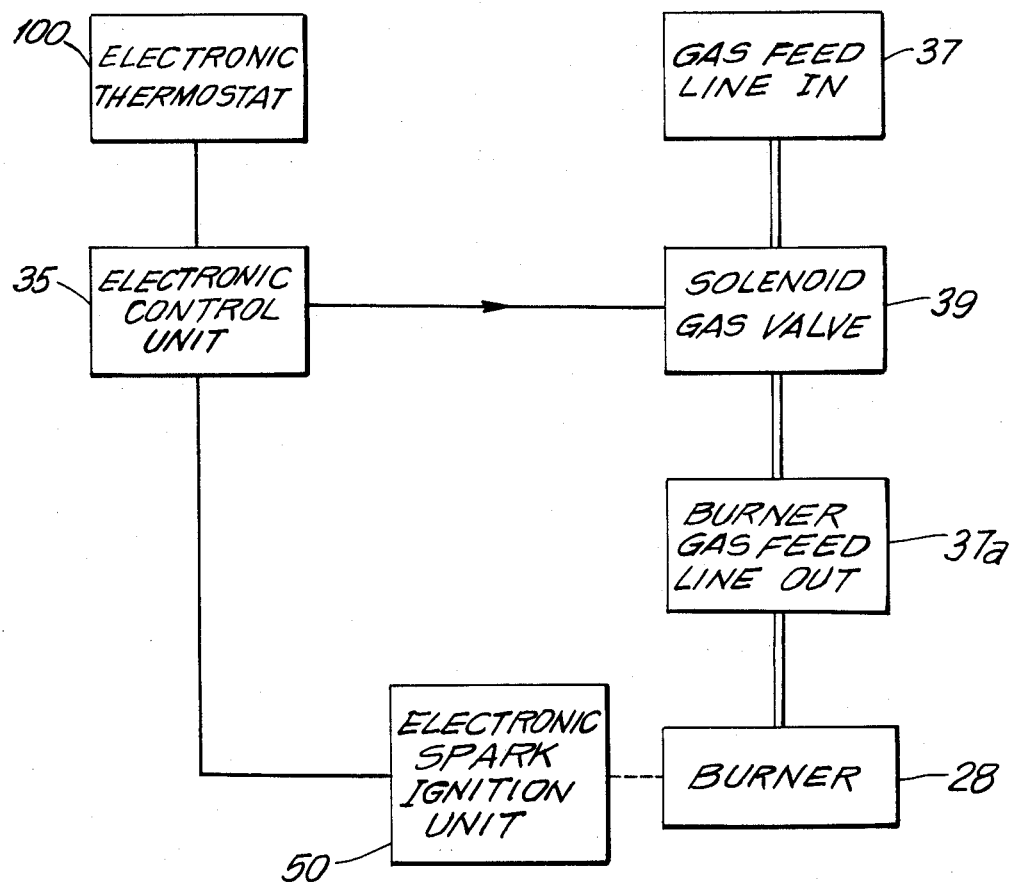
FIG. 7 is a block diagram of the direct spark ignition system according to the preferred embodiment of the present invention.

FIGS. 5-7 illustrate the preferred embodiment of the electronical controlled ignition system according to the present invention, having reference numerals corresponding to FIGS. 1-4. Applicant eliminates the conventional thermostatically-controlled pilot burner provided on prior art poultry brooders by providing a Honeywell S87B Direct Spark Ignition unit available from Honeywell Corp. of Albuquerque, N. Mex. Surprisingly, however, Applicant positions the electronic control unit directly beneath the gas burner and ceramic radiant element 12.

If a person of ordinary skill in the art of designing and constructing poultry brooders was inclined to provide a direct spark ignition system, the natural tendency would be to position as few elements of the spark system as possible in the vicinity of the ceramic element in order to minimize exposure to the high temperatures of the radiant ceramic element. The most likely configuration to accomplish this result is to position the electronic control unit and solenoid above canopy 20 adjacent leveling hanger 36, with only the spark unit 50 adjacent to the gas burner 28. Naturally, the insulated spark wire 44 would be extended to reach the electronic control unit above the canopy 20. However, Applicant has found that such a configuration does not produce consistently reliable gas burner ignition.

In the Honeywell direct spark ignition unit an electronic thermostat activates electronic control unit 35 when the gas burner 28 is to be ignited. Electronic control unit 35 then activates spark unit 50 by providing an electric current through spark wire 44 and opens solenoid valve 39 to supply fuel to gas burner 28. Electronic control 35 is pre-programmed to provide an electric current to spark unit 50 for whatever period is believed necessary to assure ignition of gas burner 28. In Applicant's preferred embodiment electronic control unit 35 provides current to spark wire 44 to activate spark unit 50 for 11 seconds. At the end of this time period the electric current to spark wire 44 is terminated.

The Honeywell electronic control unit is also pre-programmed to include a safety cut-off feature to prevent any dangerous leakage of unburned gas. Since a burning flame acts to short-circuit a spark gap, the Honeywell electronic control unit 35 is provided with a sensor to detect whether a flame has short-circuited the spark gap disposed across the gas burner. If the sensor does not detect a short circuit across the spark gap at or before the end of the pre-programmed spark period, electronic control unit 35 closes solenoid valve 39 to prevent leakage of unburned gas.

It is this safety feature that presents problems in positioning the electronic control unit above canopy 20. During the ignition period the electric current supplied to spark wire 44 is on the order of 20 to 30 microamperes and 25 volts. The safety sensor of control unit 35 must sense the returning current from the short-circuited spark gap within the preset period or solenoid valve 39 will be closed and the gas supply terminated.

However, since the current provided to spark wire 44 is small there is a tendency for the current from the short-circuited spark gap to be attenuated by the resistance of spark wire 44. Naturally, lengthening spark wire 44, as required to position the control unit above the canopy, increases the effective resistance of the wire and, consequently, increases the likelihood that the sensor will not detect the short-circuit current. This results in unnecessary termination of the gas supply and makes for an unreliable ignition system.

As shown in FIGS. 1 and 5, electronic control circuit unit 35 is mounted directly beneath mounting plate 46 adjacent to gas burner 28. The electronic control unit is not positioned directly below gas burner 28 since that would interfere with air flow into the burner for combustion. Electronic control unit 35 is also spaced apart from mounting plate 46, as by being mounted with bolts and nuts 48 and spacers 49 to create an air gap 52. Electronic control unit 35 is covered by a top metal plate 56 and an insulation plate 58, which may be of the non-asbestos rigid board type. Air gap 52, top metal plate 56, and insulation plate 58 all act to insulate electronic control unit 35, solenoid valve 39 and the appurtenant wiring from exposure to radiant energy projected by ceramic radiant 12 during use. Solenoid valve 39 is also mounted to top metal plate 56 and insulation plate 58, as by nuts and bolts 48a. Preferably, bottom metal housing 60 is provided to protect and contain the electronic control unit, solenoid valve, and appurtenant wiring. One or more metal front, back and side panels (not shown) may be provided to protect and contain the wiring of the electronic spark control unit.

Referring more particularly to FIG. 5, a partial bottom plan view of the direct spark ignition poultry brooder unit according to the present invention along lines 5—5 of FIG. 1, gas feed 37 is connected to the "IN" side of electrically controlled solenoid valve 39. Gas burner feed line 37a is connected to the "OUT" side of solenoid valve 39 and to gas burner 28. Activating wire 30 from an electronic thermostat (not shown) is connected to the input terminals 62, 63 of electronic control unit 35 by connections 30a and 30b. Solenoid wires 64, 65 are connected to electronic control unit 35 at output terminals 66, 67 and to solenoid terminals 68, 69 of solenoid valve electrical control unit 39a. Spark ignition terminal 70 is connected to insulted spark wire 44. A ground wire 72 connects ground terminal 74 of electronic control unit 35 to metal mounting plate 46. A safety fuse 47 viewable from the front of the electronic control unit 35 is also provided (See FIG. 1).

The spark unit 50 is shown in greater detail in FIG. 6, a partial bottom plan view along lines 6—6 of FIG. 1. Spark wire 44 is connected to the rear terminal 76 of spark plug 78. Forward spark plug terminal 82 is in closely spaced relationship with spark plate 84 to create a spark gap 80. Spark plate 84 is in electrical communication with mounting bracket 92. Coaxial ceramic insulation jacket 86 isolates the spark terminals from metal shielding 88, 90 and metal mounting bracket 92, particularly at the spark plug mounting nut 94. Circle 96 represents the top opening of the generally conical cone forming gas burner 28. It is important that spark gap 80 be disposed over opening 96 to assure ignition of the gas burner and proper functioning of the safety cut-off feature of the Honeywell electronic control unit.

As shown in FIG. 1, metal mounting bracket 92 is attached, as by welding, to mounting plate 46. Metal shields 88, 90, surround and protect the spark plug 78 from radiant energy distributed by ceramic radiant 12 during use. Shield 90 extends from shielding 88 to cover the forward portion of ceramic insulation jacket 86. As will be apparent from the foregoing discussion, the electronic spark circuit is completed by the conductive communication of spark plate 84 with mounting bracket 92 which, in turn, is conductively attached to metal mounting plate 46, including ground wire 72.

Finally, FIG. 7 is a schematic diagram of the direct spark ignition unit. When electronic thermostat 100 signals electronic control unit 35 that gas burner 28 is to be ignited, electronic control unit 35 (i) electronically opens solenoid gas valve 39 via solenoid valve control unit 39a, and (ii) provides current to the spark wire to initiate a spark across spark gap 80 of spark unit 50. If, within the preset time period, the flame sensor of electronic control unit 35 senses a short circuit across the spark gap, indicating the presence of a flame across that gap, then current to the spark unit is terminated and solenoid gas valve 39 is left open until thermostat 100 directs electronic control unit 35 to terminate heating. If, however, the preset time period elapses and no short-circuit and, consequently, no flame is detected, then electronic control unit 35 terminates current to spark unit 50 and closes solenoid valve 39 to prevent dangerous leakage of gas. At this point, electronic control unit 35 can only be reactivated by reducing the temperature setting on thermostat 100 for at least 30 seconds.

In use, the poultry brooder in accordance with the preferred embodiment of the present invention, as shown in FIG. 1, is suspended over the poultry house floor by leveling hangar 36. The required floor or house temperature is adjusted on a thermostat (not shown) connected via thermostat wire 30 to electronic control unit 35. The thermostat activates electronic control unit 35 which, in turn, opens gas solenoid valve 39 and actuates spark unit 50 to ignite gas burner 28, as required, to produce heat. Gas burner 28 produces hot gases by combustion, which hot gases rise to and impinge upon ceramic radiant element 12 at flat center 34. Since flat center 34 is leveled when leveling hangar 36 is adjusted to level the poultry brooder, the hot gases impinging upon flat center 34 are evenly distributed across that surface and uniformly enter channels 18. The hot gases flow upwardly and outwardly across the ceramic radiant element toward the peripheral edge thereof by following channels 18 defined by protrusions 14 and connectors 16. Projection connectors 16 prevent the hot gases from flowing directly to the nearest edge of the ceramic element and force the gases to follow paths defined by the spiral channels.

While flowing through channels 18, the hot gases contact the bottom surface of ceramic radiant 12, protrusions 14 and connectors 16, transferring heat from the combustion products to the ceramic radiant. The spiral path of channels 18 lengthens the distance that the hot gases must traverse in order to reach the periphery of the ceramic element, thereby increasing the amount of time the hot gases remain in contact with the ceramic radiant. The irregularity of the channel walls created by the different thicknesses of the protrusions and connectors, together with any irregularity in the bottom surface of the ceramic element itself, creates turbulence in the hot gases which inhibits the flow of the hot gases through the channels. Therefore, not only must the hot gases travel a greater distance to reach the edge of the ceramic radiant through the spiral channels than would be the case if they could flow directly between protrusions 14, but the configuration of the spiral channels creates turbulence which inhibits gas flow. These two effects combine to increase the length of time the gas remains in contact with the ceramic radiant, thereby maximizing heat transfer from the hot gases to the ceramic element. Connectors 16 also increase the surface area of the ceramic element which contacts the hot gases, also serving to facilitate greater heat transfer to the ceramic radiant. Advantageously, turbulence in the gases flowing through the spiral passageways may be further maximized by roughening the bottom surface of the ceramic element and the surface of the projections and projection connectors.

Insulator 26 significantly reduces undirected heat loss through the top or rear surface of the ceramic radiant, thereby saving fuel that would ordinarily be spent heating the ceramic radiant so as to compensate for the dissipation of energy through the rear surface. Leveling poultry brooder 10 and, therefore, flat center 34 by leveling hangar 36 also is advantageous in that it assures uniform distribution of the gases to spiral channels 18 and, therefore, uniform heating of the ceramic radiant.

Thus, it will be seen from the foregoing that the protrusions and connectors jointly increase the surface area of the ceramic element to facilitate heat transfer and create the spiral channels and turbulence which lengthen the amount of time the hot gases remain in contact with the ceramic radiant, thereby acting in concert to maximize heat transfer to the ceramic radiant. The insulator reduces heat loss through the top or rear surface of the ceramic radiant so that a greater amount of energy is retained on the lower surface of the brooder in order that brooder 10 and, more specifically, ceramic radiant 12 may more efficiently radiate heat and radiant energy downwardly to the poultry house floor. Canopy roof 20 also retains the heat of the ceramic element and reflects stray radiation toward the poultry house floor.

The direct spark ignition unit according to the present invention advantageously provides reliable ignition of the gas burner while also eliminating the need for any pilot burner. The elimination of the pilot burner has been found to provide substantial fuel savings even when the slight increase in electrical energy consumption attributable to the requirements of the electronic control unit and spark unit is taken into account. Moreover, it has remarkably been found that disposing the insulated and shielded electronic control unit and solenoid valve directly beneath the ceramic element in order to minimize the length of spark wire 44 does not detract substantially from the effective distribution of radiant energy from the ceramic radiant to the poultry house floor.

EXAMPLE 1

By way of example, the effectiveness of the direct spark ignition system according to the present invention has been evaluated by comparing the fuel consumption costs of a brooder having a direct spark ignition system with pilot brooders having various standard pilot orifices.

In order to appreciate the significance of this study it must be pointed out that the direct spark ignition brooder considered in this study does not include any other aspects of the present invention. That is, for the purpose of this study the direct spark ignition system according to the present invention was mounted onto a poultry brooder (i) including a ceramic radiant element having projections arranged in spiral rows but not connected by walls or webs according to the present invention, and (ii) not including a radiant insulator element according to the present invention. Thus, all comparison data set forth below is intended to reflect fuel cost savings resulting only from the direct spark ignition system according to the present invention.

TABLE I

| | Daily Consumption Of Pilot Burners With Standard Orifices | | |
|---|---|---|---|
| Pilot | Orifice Drill Size | B.T.U.'s per hr. | B.T.U.'s per day |
| A | .009 | 641 | 15,384 |
| B | .010 | 791 | 18,984 |
| C | 80 | 1,430 | 34,320 |
| D | 78 | 2,015 | 48,360 |

Thus, standard pilot burners consume from 15,000 to 48,000 B.T.U.'s per day. For a 20,000 chick capacity farm with a 1,000:1 chick to brooder ratio twenty brooders would be used. As shown in Table II, operating twenty brooders for thirty days would cost from $70.00 to $220.00 simply to run the twenty pilot burners.

TABLE II

| | Thirty Day Cost for 20 Brooders —20,000 Bird Capacity | | | |
|---|---|---|---|---|
| Pilot | B.T.U.'s per day | B.T.U.'s per day for 20 brooders | 20 brooder fuel consumption per day at 91,500 B.T.U.'s per gal. | Estimated cost for 30 day operation of 2 brooders at est. $.70 per gal. |
| A | 15,384 | 307,680 | 3.36 gal. | $70.56 |
| B | 18,984 | 379,680 | 4.15 gal | $87.15 |
| C | 34,320 | 686,400 | 7.50 gal. | $157.50 |
| D | 48,360 | 967,200 | 10.57 gal. | $221.97 |

TABLE III

| Thirty Day Cost for 1,000 Pilot Brooders —1,000,000 Bird Capacity | |
|---|---|
| Pilot | Cost |
| A | $3,528.00 |
| B | $4,357.50 |
| C | $7,875.00 |
| D | $11,098.50 |

In contrast, the minimal cost of the electrical consumption for the direct spark ignition system can be summarized as follows. The maximum current draw for the Honeywell 887B Direct Spark Ignition Unit while the unit is running is one half ($\frac{1}{2}$) ampere at 24 volts, which translates into a power consumption of 12 watts while the unit is operating. Since:

$$\frac{1,000 \text{ watt hours}}{12 \text{ watts}} = 83.3 \text{ hours}$$

it follows that one kilowatt-hour of power will run an ignition unit for over 3 days, i.e. over 72 hours.

However, since brooders actually operate only twenty percent (20%) of the time three direct spark ignition operating days translates into 15 chick brooding days. Thus, operating one direct spark brooder for thirty days will consume less than 2 kilowatt-hours of power. Assuming a power cost of $0.10 per kolowatt-hour it follows that operating one brooder for thirty days costs just $0.20.

TABLE IV

| Cost of Operating Direct Spark Brooders for 30 days | |
|---|---|
| No. of Brooders | Cost |
| 1 | $.20 |
| 20 | $4.00 |
| 1,000 (1,000,000 bird capacity) | $200.00 |

Finally, the cost savings for 20 brooder and 1,000 brooder operations directly attributable to the direct spark ignition system according to the present invention can be summarized as set forth in Table V.

TABLE V

| Cost Savings of Using Direct Spark System Over Pilot Burners for Thirty Days Brooding Time | | |
|---|---|---|
| Pilot | 20 Brooder Savings | 1,000 Brooder Savings |
| A | $66.56 | $3,328.00 |
| B | $83.15 | $4,157.50 |
| C | $153.50 | $7,675.00 |
| D | $217.97 | $10,898.50 |

The results of this comparison clearly show that the fuel cost savings directly attributable to the direct spark ignition system according to the present invention are quite dramatic. One million bird capacities are quite common in today's highly competitive brooding industry, so the fuel savings attributable to the direct spark ignition system according to the present invention mount very quickly. Needless to say, the fuel savings attainable using the direct spark ignition system in conjunction with the ceramic radiant and the radiant insulator according to the present invention are quite remarkable.

To the extent not already indicated, it will be understood by those of ordinary skill in the art that any one of the various specific embodiments herein described and illustrated may be further modified to incorporate features shown in other of the specific embodiments, as desired.

The invention in its broader aspects therefore is not limited to the specific embodiments herein shown and described but departures may be made therefrom within the scope of the accompanying claims, without departing from the principles of the invention and without sacrificing its chief advantages.

What is claimed is:

1. A poultry brooder comprising:
a canopy roof;
an inverted frusto-conical ceramic heat radiating element suspended beneath said canopy roof;
gas burner means beneath the center of said ceramic radiant element; and
direct spark ignition means disposed adjacent said gas burner means in the radiant path of said ceramic radiant element for igniting said gas burner, said direct spark ignition means including an electronic control unit, an electronic gas solenoid valve controlled by said electronic control unit and connected to the fuel source for said gas burner means, and a spark unit having a spark gap disposed over said gas burner means.

2. The poultry brooder according to claim 1, wherein said electronic control unit opens said solenoid valve to provide fuel to said gas burner means and provides electric current to said spark unit to create a spark across said spark gap to ignite said gas burner means.

3. The poultry brooder according to claim 2 wherein said electronic control unit is protected from the radiant energy of said ceramic radiant element by control unit insulation means.

4. The poultry brooder according to claim 3 wherein said control unit insulation means further comprise a metal mounting plate, an insulative air gap, and an insulation plate disposed between said ceramic radiant and said electronic control unit.

5. The poultry brooder according to claim 4 wherein said insulation plate is composed of a non-asbestos material.

6. The poultry brooder according to claim 1 wherein said spark unit includes a spark plug having an axial conductive core insulated in the middle region thereof away from said spark gap by a coaxial ceramic jacket surrounding said core.

7. The poultry brooder according to claim 6 further comprising shielding means disposed between said coaxial ceramic jacket and said ceramic element.

8. The poultry brooder according to claim 1 wherein said spark gap is disposed in the path of the flame of said gas burner.

9. The poultry brooder according to claim 8 wherein said electronic control unit is further provided with means to detect the presence of a flame at said gas burner means.

10. The poultry brooder according to claim 9, wherein said electronic control unit closes said solenoid valve if, after a preset time period for ignition, no flame is detected at said gas burner means.

11. The poultry brooder according to claim 1 wherein said ceramic element is provided with multiple projections protruding from the bottom surface thereof.

12. The poultry brooder according to claim 11 wherein said multiple projections are arranged in a plurality of spaced spiral rows.

13. The poultry brooder according to claim 12 further comprising connecting means for connecting said projections to define spiral passageways.

14. The poultry brooder according to claim 1 further comprising insulating means disposed above the top surface of said ceramic element for reducing heat loss through said top surface.

15. The poultry brooder according to claim 14 wherein said insulating means is shaped similarly to said top surface of said ceramic element and contacts said radiant element only at the peripheral rim of said ceramic element, thereby creating and air gap between said top surface and said insulating means.

16. The poultry brooder according to claim 15 wherein said insulating means further comprise an alumina-silica composition.

17. The poultry brooder according to claim 1 wherein said electronic control unit is thermostatically controlled.

18. In a poultry brooder including a ceramic heat radiating element and a gas burner, the improvement comprising direct spark ignition means for igniting the gas burner, said direct spark ignition means being disposed adjacent to the gas burner in the radiant path of the ceramic radiant element, said direct spark ignition means including an electronic control unit, an electronic solenoid gas valve controlled by said electronic control unit and connected to the fuel source for the gas burner, and a spark unit having a spark gap disposed in the flame path of the gas burner.

19. The poultry brooder according to claim 18 wherein said electronic control unit opens said solenoid valve and provides electric current to said spark unit to create a spark at said spark gap to ignite the gas burner.

20. The poultry brooder according to claim 19 wherein said electronic control unit closes said solenoid valve to extinguish the gas burner.

21. The poultry brooder according to claim 18 further comprising control unit insulation means disposed between the ceramic element and said electronic control unit.

22. The poultry brooder according to claim 21 wherein said control unit insulation means further comprise a metal mounting plate, an insulative air gap, and an insulation plate.

23. The poultry brooder according to claim 22 wherein said insulation plate is composed of a non-asbestos material.

24. The poultry brooder according to claim 18 wherein said spark unit further comprises a spark plug having a conductive axial core and an insulative coaxial ceramic jacket in the middle region thereof, said coaxial ceramic jacket being protected from direct exposure to radiant energy from the ceramic element by shielding means.

25. The poultry brooder according to claim 19 wherein said electronic control unit is provided with means for detecting the presence of a flame at the gas burner.

26. The poultry brooder according to claim 25 wherein said electronic control unit closes said solenoid valve if, after a preset time period, no flame is detected at the gas burner.

27. The poultry brooder according to claim 18 wherein said electronic control unit is thermostatically controlled.

28. A method of igniting a poultry brooder including a gas burner and a ceramic radiant element comprising:
  providing direct spark electronic ignition means adjacent to the poultry brooder gas burner and in the radiant path of the ceramic radiant element, said direct spark ignition means including an electronic control unit, an electronic gas solenoid valve controlled by said electronic control unit and connected to the fuel source for the gas burner and a spark unit having a spark gap disposed over the gas burner; and
  igniting the gas burner by activating said direct spark ignition means so that said electronic control unit transmits electrical energy to said spark unit to cause a spark across said spark gap as gas is emitted from said gas burner.

* * * * *